H. C. EDDY.
DOUBLE FIELD DEHYDRATOR.
APPLICATION FILED JUNE 25, 1921.
1,430,296.
Patented Sept. 26, 1922.
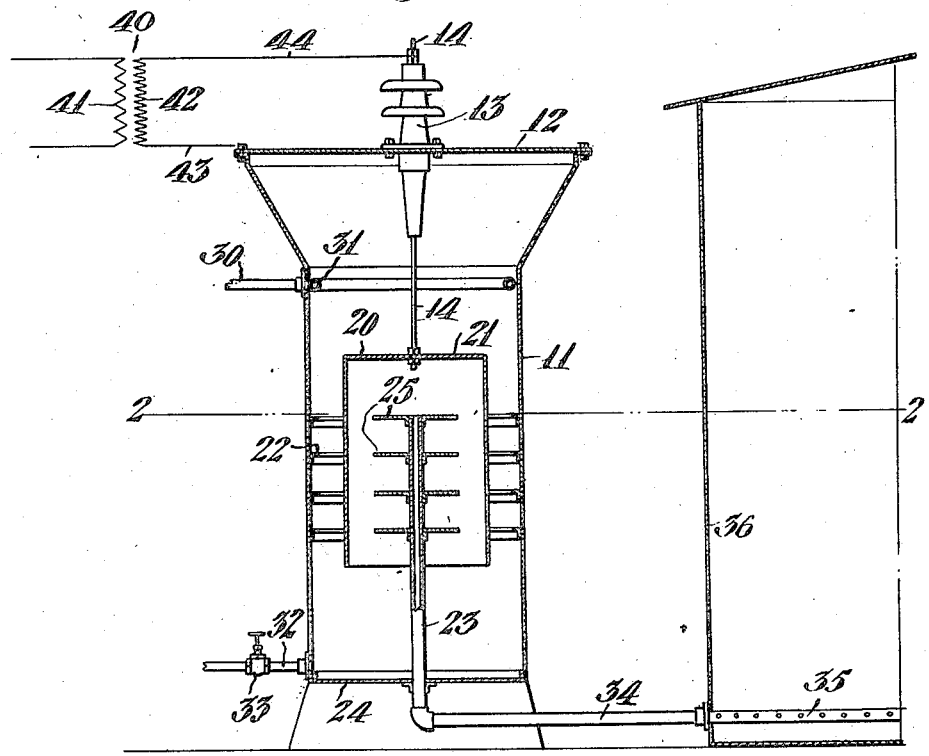
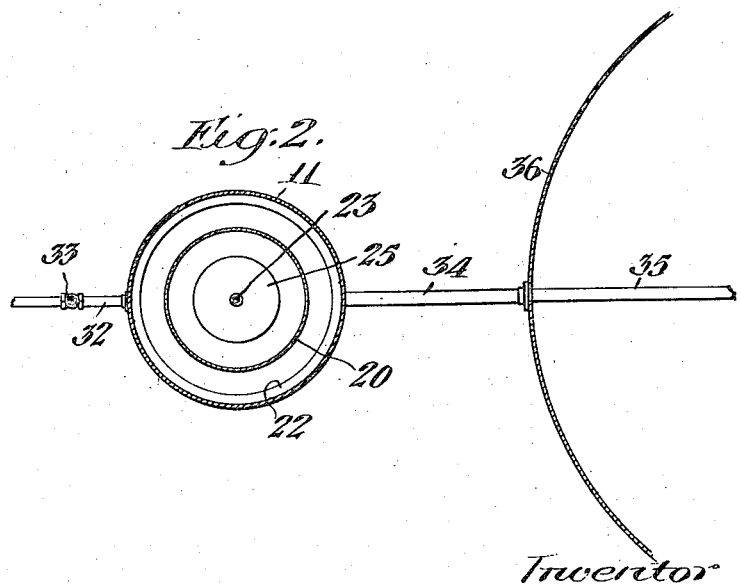
Inventor
Harold C. Eddy
by Graham & Law
Attorneys Patented Sept. 26, 1922.

1,430,296

UNITED STATES PATENT OFFICE.

HAROLD C. EDDY, OF LOS ANGELES, CALIFORNIA, ASSIGNOR TO PETROLEUM RECTIFYING COMPANY OF CALIFORNIA, OF SAN FRANCISCO, CALIFORNIA, A CORPORATION OF CALIFORNIA.

DOUBLE FIELD DEHYDRATOR.

Application filed June 25, 1921. Serial No. 480,351.

*To all whom it may concern:*

Be it known that I, HAROLD C. EDDY, a citizen of the United States, residing at Los Angeles, in the county of Los Angeles and State of California, have invented a new and useful Double Field Dehydrator, of which the following is a specification.

My invention relates to dehydrators for petroleum oils in which an electric field is utilized to agglomerate the water particles. It is a well known fact that if the petroleum emulsion is subjected to an electrostatic field that the water particles therein are caused to agglomerate or flow together forming large particles which will readily settle out by gravity.

The principal object of my invention is to provide such a dehydrator in which there will be no moving parts and which will have a large capacity.

Further objects and advantages will be made evident hereinafter.

Referring to the drawings which are for illustrative purposes only,

Fig. 1 is a sectional elevation, and, Fig. 2 is a section on a plane represented by the line 2—2 of Fig. 1.

In the form of the invention shown, 11 is a tank having a top 12 in which an insulator 13 is carried. Suspended on a rod 14 passing through the insulator 13 is a cylindrical drum 20 having an enclosed top 21. Formed on the interior of the tank concentric with the drum 20 are a series of angle irons 22. An outlet pipe 23 extends upwardly through the bottom 24 of the tank 11 and carries a series of discs 25 which are also concentric with the drum 20. Emulsion is delivered to the tank 11 through a pipe 30 and through a perforated ring 31 carried inside the tank. Water may be removed from the tank 11 through a pipe 32 controlled by a valve 33. The outlet pipe 23 is connected through a pipe 34 with a perforated pipe 35 which is situated in the bottom of a trap tank 36. A transformer 40 is provided having a low tension primary 41 and a high tension secondary 42. One side of the secondary 42 is connected to the tank through a wire 43 and the other side is connected through a wire 44 with the rod 14.

The method of operation is as follows:

Emulsion is delivered through the pipe 30 and is distributed by the perforated ring 31 about the exterior of the tank 11 flowing downwardly between the members 22 and the drum 20 into the space near the bottom of the tank. Due to the secondary 42, an electrostatic field is produced between the drum 20 and the members 22 and a considerable agglomeration of water particles takes place therein, some of these water particles settling out into the bottom of the tank 11 and being withdrawn through the pipe 32. The smaller particles are carried upwardly with the oil to the space between the drum 20 and the plates 25 where a further agglomeration takes place, the heavier water particles fall backwardly through the stream of oil and being withdrawn through the pipe 32 while the smaller particles are delivered through the pipe 23 and the perforated pipe 35 into the bottom of the trap tank 36 in which they readily settle out. Considerable space is left between oil inlet 31 and top of the tank 12 so as to make a dry oil pocket for insulator 13 as dry oil will float above wet oil undergoing treatment.

I claim as my invention:

1. A dehydrator comprising: a tank; an electrode concentric with said tank and having a central opening; and a member electrically connected to said tank and projecting concentrically into the opening in said electrode.

2. A dehydrator comprising: a tank; an electrode concentric with said tank and having a central opening; a pipe secured to said tank and projecting concentrically into said central opening in said electrode; and a member carried by said pipe and concentric with said opening.

3. A dehydrator comprising: a tank; means for delivering emulsion into the top of said tank; an electrode concentric with said tank and having a central opening; and a member electrically connected to said tank and projecting concentrically into the opening in said electrode.

4. A dehydrator comprising: a tank; means for delivering emulsion into the top of said tank; an electrode concentric with said tank and having a central opening; a pipe secured to said tank and projecting concentrically into said central opening in said electrode; and a member carried by said pipe and concentric with said opening.

5. A dehydrator comprising: a tank; an electrode concentric with said tank and having a central opening; means for withdrawing water from the bottom of said tank; and a member electrically connected to said tank and projecting concentrically into the opening in said electrode.

6. A dehydrator comprising: a tank; an electrode concentric with said tank and having a central opening; means for withdrawing water from the bottom of said tank; a pipe secured to said tank and projecting concentrically into said central opening in said electrode; and a member carried by said pipe and concentric with said opening.

7. A dehydrator comprising: a tank; means for delivering emulsion into the top of said tank; an electrode concentric with said tank and having a central opening; means for withdrawing water from the bottom of said tank; and a member electrically connected to said tank and projecting concentrically into the opening in said electrode.

8. A dehydrator comprising: a tank; means for delivering emulsion into the top of said tank; an electrode concentric with said tank and having a central opening; means for withdrawing water from the bottom of said tank; a pipe secured to said tank and projecting concentrically into said central opening in said electrode; and a member carried by said pipe and concentric with said opening.

In testimony whereof, I have hereunto set my hand at Los Angeles, California, this 17th day of June, 1921.

HAROLD C. EDDY.